O. F. BEYTHAN.
SEED SEPARATOR.
APPLICATION FILED FEB. 12, 1916.
1,199,231.
Patented Sept. 26, 1916.
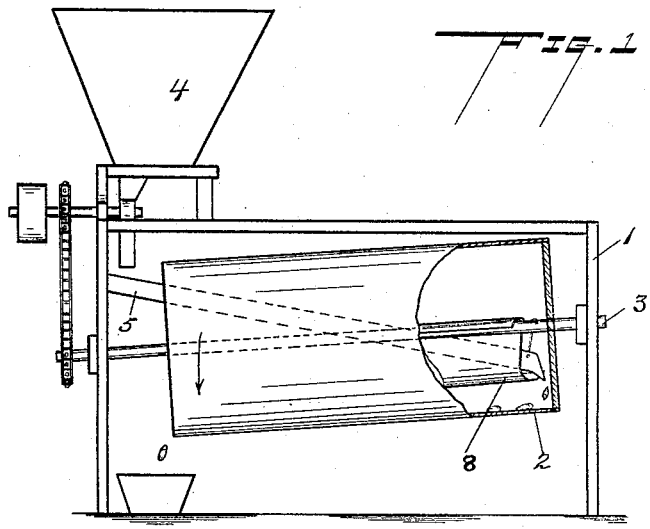
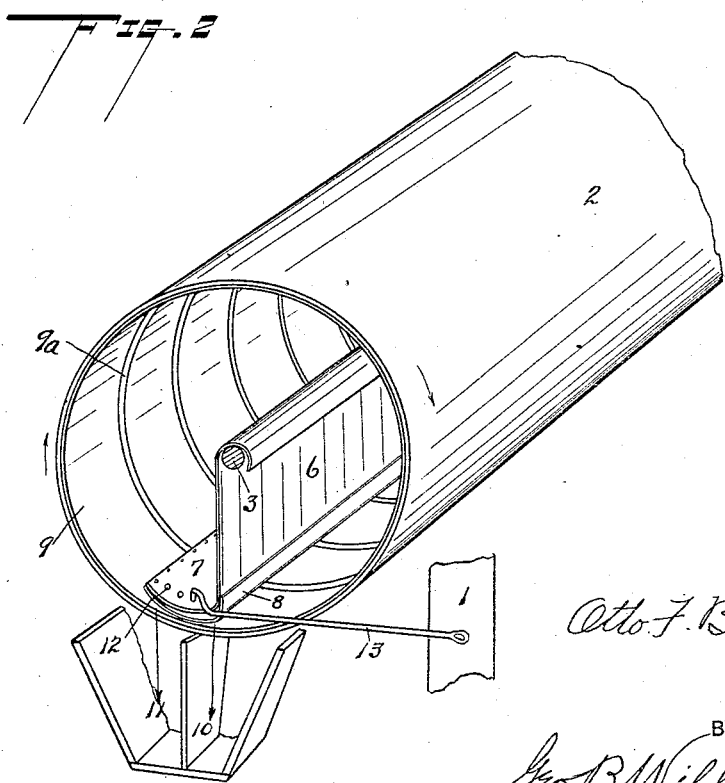

UNITED STATES PATENT OFFICE.

OTTO F. BEYTHAN, OF FREELAND, MICHIGAN.

SEED-SEPARATOR.

1,199,231.   Specification of Letters Patent.   Patented Sept. 26, 1916.

Application filed February 12, 1916. Serial No. 77,834.

*To all whom it may concern:*

Be it known that I, OTTO F. BEYTHAN, a citizen of the United States, residing at Freeland, in the county of Saginaw and State of Michigan, have invented certain new and useful Improvements in Seed-Separators; and I do hereby declare the following to be a full, clear, and exact description of the invention, such as will enable others skilled in the art to which it appertains to make and use the same.

This invention relates to bean picking machines and pertains more particularly to that class of bean picking machines in which the beans are brought into contact with two slightly frictional surfaces as rubber, cloth, felt, or other suitable material, the surfaces being adapted to move with relation to each other and being so arranged that smooth perfect beans will not be drawn in between the surfaces, but slightly rough, split, or imperfectly shaped beans will be drawn between the surfaces, whereby the perfect beans are separated from the inferior beans.

My improvement pertains still more particularly to a novel construction and combination of the parts of a bean picking machine whereby the objects of my invention are attained. These objects are, first, to provide a simple and inexpensive bean picking machine that will not require minute adjustment, or skilled attendance to insure proper work.

Another object is to provide a bean picking machine that will be simple in construction and effective in operation, having all of its parts easily accessible.

With these and other objects in view which will appear later in the specification, my invention consists in the devices described and claimed and the equivalents thereof.

In the drawings, Figure 1 is a part sectional side elevation showing the bean picking machine with my improvements attached. Fig. 2 is a perspective detail of the device by which the good beans are separated from the rough and split beans.

As is clearly shown in the drawings, the device consists in a suitable frame 1 carrying a slightly inclined revoluble cylinder 2, which is mounted on a shaft 3.

A hopper 4 supplies the beans to a chute 5, by which they are delivered to the higher end of the cylinder, 2, as indicated in Fig. 1.

The interior surface of the shell of cylinder 2 is preferably lined with a suitable slightly frictional material such as carpet, rubber, or any fabric or other substance that is capable of permitting smooth beans to slide, while causing rough beans to slightly adhere to the surface, for the purpose which will presently be described.

Suspended from the shaft 3 is a hanger 6 having a laterally projecting flange 7. To the under side of flange 7 is secured a flexible apron of carpet, fabric, rubber, or similar material. The apron is preferably secured to both edges of flange 7 by riveting, cementing or otherwise. Its middle part hangs down out of contact with the under side of flange 7 and rests yieldingly upon the lining material 9 of the cylinder, the purpose being to provide a yielding contact under slight pressure between the apron 8 and the lining 9. The apron 8 preferably extends throughout the length of the cylinder 2, as shown in Fig. 1.

In operation, the beans are delivered into the interior of cylinder 2 at its higher end in advance of the apron, and the cylinder is revolved in the direction indicated by the arrows. The beans roll toward the lower end of the cylinder and are simultaneously drawn against the flexible apron 8. Smooth beans do not pass under the apron, but are deflected along the entering part of the apron and delivered from the lower end of the cylinder at 10. Rough or split beans are, by reason of their frictional engagement of the lining 9 and apron 8, drawn under the apron and are released at its outer edge, as indicated at 11. The two grades are delivered into separate receptacles, as indicated in Fig. 2.

The frictional lining may be secured to the cylinder 2 in any suitable or convenient manner. It may be glued to the cylinder, but on account of the necessity of renewing or cleaning the lining, I prefer to secure it in place in the cylinder by means of a helical wire $9^A$, which is slipped into the cylinder after the lining 9 is in place. The wire $9^A$ is preferably of relatively small diameter so that it does not project above the surface of the lining far enough to interfere with proper sorting of the beans.

The hanger 6 and its flange 7 are preferably removably suspended from the shaft 3 so that the apron 8 may be easily and quickly replaced. The hanger and flange are preferably made of a single sheet of metal as shown in Fig. 2, but they may be constructed in any other suitable or desired manner.

To secure a certain degree of adjustment of the fineness of grade to suit different qualities of beans, I merely move the apron 8, either to the right or left, as the case may be.

In Fig. 2 I have shown holes 12 in the flange 7 adapted to be engaged by a hook 13 mounted on the frame 1. By inserting the hook in various holes, the angle of inclination of hanger 6 may be changed, thereby regulating the distance of the intake edge of apron 8 from the lowest part of the curve of cylinder 2. Thus, when the hanger 6 is to the left of its vertical position, beans are required to ride up the slightly inclined surface of the lining 9 before coming into contact with apron 8, and the beans, therefore, have less tendency to pass between the apron 8 and the lining 9, thereby permitting a larger percentage of slightly defective beans to be delivered with the good beans.

Having thus described my invention, what I claim and desire to secure by Letters Patent is:

1. In a bean picking machine, the combination of a revoluble inclined cylinder, a lining in said cylinder having a slightly frictional surface, a flexible apron loosely suspended within said cylinder and extending lengthwise thereof, the lower surface of said apron being in proximity to the frictional lining of the cylinder, and means for introducing beans into the elevated end of said cylinder in advance of said apron.

2. In a bean picking machine, the combination of a revoluble inclined cylinder, a removable lining in said cylinder having a slightly frictional surface, means for removably securing said lining in the cylinder, a flexible apron loosely suspended within said cylinder and extending lengthwise thereof, the lower surface of said apron being in proximity to the frictional lining of the cylinder and means for introducing beans into the elevated end of said cylinder in advance of said apron.

3. In a bean picking machine, the combination of a revoluble inclined cylinder, a lining in said cylinder having a slightly frictional surface, a hanger suspended within said cylinder, a lateral flange on said hanger extending lengthwise said cylinder, a flexible apron loosely suspended from said flange, the lower surface of said apron being in proximity to the frictional lining of the cylinder, and means for introducing beans into the elevated end of said cylinder in advance of said apron.

4. In a bean picking machine, the combination of a revoluble inclined cylinder, a removable lining in said cylinder having a slightly frictional surface, means for removably securing said lining in the cylinder, a central supporting shaft for said cylinder, a hanger removably suspended from said shaft, a lateral flange on said hanger extending lengthwise said cylinder, a flexible apron loosely suspended from said flange, the lower surface of said apron being in proximity to the frictional lining of the cylinder, and means for introducing beans into the elevated end of said cylinder in advance of said apron.

5. In a bean picking machine, the combination of a revoluble inclined cylinder, a lining in said cylinder having a slightly frictional surface, a hanger pivotally suspended within said cylinder, a laterally projecting member on said hanger, a flexible apron loosely suspended beneath said member and secured near the opposite edges thereof, and extending lengthwise in said cylinder in proximity to its frictional lining, and means for introducing beans into the higher end of said cylinder in advance of said apron.

In testimony whereof I affix my signature in presence of two witnesses.

OTTO F. BEYTHAN.

Witnesses:
  Geo. F. Barbarin,
  Elwood Turnbull.